3,560,476
BASIC MONOAZO AND DISAZO DYES CONTAINING HYDROXYETHYL HYDRAZINIUM GROUPS
Roland Entschel and Curt Mueller, Basel, and Walter Wehrli, Riehen, Switzerland, assignors to Sandoz Ltd., Basel, Switzerland
No Drawing. Continuation-in-part of applications Ser. No. 188,837, Apr. 19, 1962, now Patent No. 3,252,965, Ser. No. 188,889, Apr. 19, 1962, now Patent No. 3,252,967, Ser. No. 250,787, Ser. No. 250,788, and Ser. No. 250,789, all Jan. 11, 1963, Ser. No. 300,068, Aug. 5, 1963, Ser. No. 306,306, and Ser. No. 306,321, both Sept. 3, 1963, Ser. No. 344,557, Feb. 13, 1964, and Ser. No. 610,718, Jan. 20, 1967. This application June 26, 1967, Ser. No. 648,962
Claims priority, application Switzerland, Apr. 21, 1961, 4,709/61; Jan. 12, 1962, 359/62; Apr. 24, 1962, 4,709/62; May 3, 1963, 5,588/63; Jan. 16, 1964, 479/64; Feb. 7, 1964, 1,482/64
Int. Cl. C09b 29/36, 45/48; D06p 1/02
U.S. Cl. 260—152
7 Claims

ABSTRACT OF THE DISCLOSURE

Basic dyes of the monoazo and disazo series containing at least one hydrazinium group of the formula:

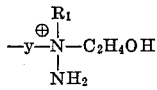

connected to a dye radical A, wherein $R_1$ is methyl, ethyl or hydroxymethyl or, together with the bridge member $y$ and the dye radical A and the N-atom bound to $R_1$, is:

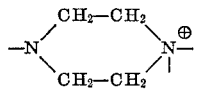

are excellent for dyeing, padding or printing Orlon and related materials.

---

The present invention is a continuation-in-part application to our co-pending applications Ser. No. 188,837, filed on Apr. 19, 1962, now U.S. Pat. No. 3,252,965; Ser. No. 188,889, filed on Apr. 19, 1962, now U.S. Pat. No. 3,252,967; Ser. No. 250,787, filed on Jan. 11, 1963; now abandoned, Ser. No. 250,788, filed on Jan. 11, 1963; now abandoned, Ser. No. 250,789, filed on Jan. 11, 1963; now abandoned, our continuation-in-part application, Ser. No. 300,068, filed on Aug. 5, 1963, now abandoned, our continuation-in-part application, Ser. No. 306,306, filed on Sept. 3, 1963, now abandoned, our continuation-in-part application, Ser. No. 306,321, filed on Sept. 3, 1963, and now abandoned, our continuation-in-part application, Ser. No. 344,557, filed on Feb. 13, 1964, and now abandoned, and our continuation-in-part application Ser. No. 610,718, filed Jan. 20, 1967, and relates to basic dyestuffs and process for the production.

This invention relates to basic dyes of the formula:

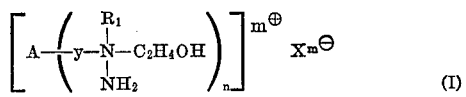

wherein A represents a member selected from the group consisting of a monoazo and a disazo dyestuff moiety, said moieties being free from carboxylic acid and sulfonic acid groups,
$y$ represents a member selected from the group consisting of a methylene group and a divalent and a trivalent organic radical bound through the cited methylene group to the adjacent N-atom,
$R_1$ represents a member selected from the group consisting of methyl, ethyl and hydroxyethyl and together with the bridge member $y$ and A and the N-atom bound to $R_1$, a heterocyclic ring system,
$n$ represents one of the integers 1 and 2,
$m$ represents one of the integers 1 and 2, when $n$ stands for the integer 1, and 2, when $n$ stands for the integer 2, and
$X^\ominus$ denotes an anion equivalent to the dyestuff cation.

These new dyes of Formula I can conveniently be prepared by replacing or converting $n$ substituents Z in a compound of the formula:

$$B\text{-}(y\text{---}Z)_n \qquad (II)$$

by, or into, $n$ groups of the formula

wherein B represents A or the radical of a compound capable of the formation of a monoazo or a disazo dye A, and Z a substituent which can be replaced by, or converted into a group of Formula III, upon which the reaction product is converted by a coupling or a condensation reaction into a dye in cases where B represents the radical of a compound capable of the formation of a monoazo or a disazo dye. A preferred mode of operation of the present process for the production of the new basic monoazo or disazo dyes comprises reacting 1 mol of a compound of the formula:

$$B\text{-}(y\text{---}E)_n \qquad (IV)$$

wherein E represents the acid radical of an ester, with $n$ mols of a compound of the formula:

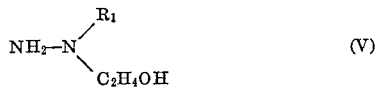

and converting the reaction product into a monoazo or disazo dye, when B stands for the radical of a compound which permits the formation of a dye. It is also possible to quaternate a compound of the formula:

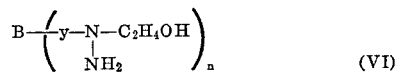

with an agent yielding methyl, ethyl or hydroxyethyl groups, and to convert the reaction product into a monoazo or a disazo dye when B represents the radical of a compound which permits formation of a dye.

A further preferred mode of operation of the process for the production of the new basic dyes comprises reacting 1 mol of an amine of the formula:

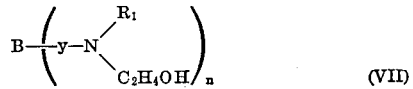

with $n$ mols of a halogen amine and, when B represents a radical capable of dye formation, converting the reaction product into a monoazo or a disazo dye.

Monoazo- or disazo dye radicals containing metal atoms bound by coordination links can also be used. The ortho, ortho'-dihydroxy or ortho, ortho'-hydroxyamino compounds, together with the ions of heavy metals, such as Fe, Cu, Ni, Cr, Co, Mn are suitable for the formation of 1:1 and 1:2 metal-complex dyes. The components B which are suitable for the formation of the monoazo or disazo dye radical A are preferably those which can be converted into the above-mentioned azo dye radicals by reaction with a diazonium salt or a coupling compound.

The azo coupling reaction is carried out in the known way, preferably in a weakly alkaline to acid medium which may be buffered if necessary.

Other suitable components B are compounds which contain a functional group or a group convertible into a functional group. These compounds are reacted with the components used for the formation of the monoazo or disazo dye radical A to give the final dye of Formula I, e.g. by a condensation reaction.

Methylating, ethylating or hydroxyethylating agents which are suitable for converting compounds of the Formula VI into the dye salt conforming to the present process, e.g. the esters of strong mineral acids and organic sulfonic acids, such as methyl-, ethyl- or hydroxyethylchloride, -bromide and -iodide, methyl-, ethyl- or hydroxyethylesters of low molecular alkane sulfonic acids or benzene sulfonic acid. The alkylation or quaternation is effected preferably in an inert solvent or, where suitable, in an aqueous suspension, or without solvent in an excess of the alkylating agent and at elevated temperature and in a medium which may be buffered if necessary.

The anion or anions X may be organic or inorganic ions, e.g. the ions of methyl-sulfate, sulfate, disulfate, perchlorate, chloride, bromide, iodide, phosphorus-molybdate, phosphorus - tungsten - molybdate, benzenesulfonate, oxalate, maleinate, acetate, propionate, methansulfonate, chloroacetate or 4 - chlorobenzene-sulfonate.

Highly suitable as bridge member $y$ are a substituted or unsubstituted methylene group or a divalent or trivalent radical bound to the adjacent N through this group, e.g. —(CH$_2$)— where $p$ is the number 1 to 6,

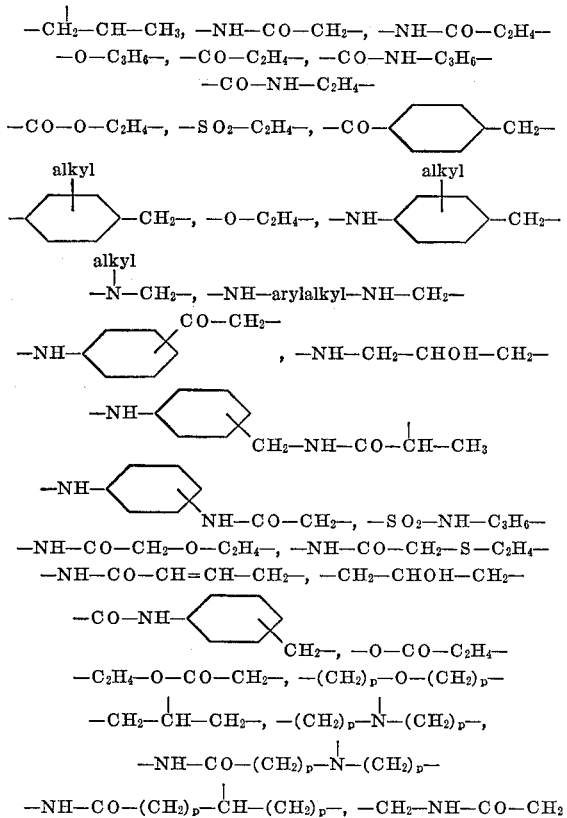

Together with R$_1$ and the adjacent N-atom, $y$ can form a heterocyclic ring system which gives rise to ring groupings, such as:

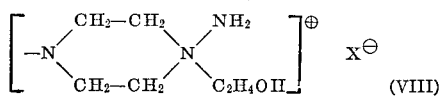   (VIII)

These compounds can be obtained, for example by reacting a compound of formula:

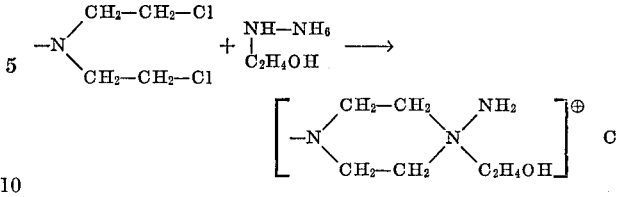

Examples of suitable acid radicals E are those of sulfuric acid, (E=SO$_4$H), a sulfonic acid (E=SO$_3$R where R is a substituted or unsubstituted hydrocarbon radical) and hydrogen sulfide (E=SH), but preferably the radicals of the halogen hydracids (E=Cl, Br etc.) are employed.

The reaction of a compound of Formula IV with a hydrazine of the Formula V is effected preferably in an organic solvent and at temperatures of —50° C. to +250° C. The reaction can also be carried out in aqueous medium, if necessary with the addition of an organic solvent, or without solvent at the above-stated temperature.

The reaction of an amine of Formula VII with a halogenamine is carried out preferably in an organic solvent and at temperatures of —50° C. to +80° C. The reaction can also be effected in aqueous medium, if necessary with the addition of an organic solvent, at the above-stated temperatures. The halogenamine can be employed either in gaseous form or in solution in an organic solvent, in water, or in a solvent-water mixture.

The dyes formed are separated by one of the basic operations, such as filtration, evaporation and filtration, precipitation from a suitable medium and filtration.

The new dyes are excellent for dyeing, padding and printing materials of polymers containing more than 80% acrylonitrile, e.g. polyacrylonitrile, e.g. Orlon (registered trademark), and copolymers containing 80–95% acrylonitrile and 20–5% vinyl acetate, methyl acrylate or methyl methacrylate.

These products are marketed under the following names, most of which are registered trademarks: Acrilan (the copolymer of 85% acrylonitrile and 15% vinyl acetate or vinyl pyridine), Orlon, Dralon, Courtelle, Crylor, Dynel, etc.

The dyeings on these materials obtained with the dyes of the process possess good fastness to light, washing, perspiration, sublimation, pleating, decatizing, pressing, water, sea water, bleaching, dry cleaning, cross dyeing and solvents. Some of the dyes are very well soluble in water.

The dyes of the present process are dyed to best advantage from aqueous medium, and it is preferable for the medium to be neutral or acid and of boiling temperature.

The commercially available retarding agents can be used in dyeing without adverse effect, though the new dyes produce perfectly level dyeings on the above-named polymers and copolymers without the addition of these agents. The dyes can be applied in closed equipment and under pressure, as they are highly stable in water to prolonged boiling. They also give very good dyeings on blend fabrics containing a polyacrylonitrile fiber on acrylonitrile copolymer fiber as one of the components. A selected number of the new dyes are suitable for dyeing polyacrylonitrile in the mass in shades fast to light and wet fastness treatments. The dyes of the present process which possess good solubility in organic solvents are suitable for the coloration of oils, paint and lacquer media, and plastics, and for the dyeing of fiber-forming materials in the spinning solution. They have many other uses, for example the dyeing of tannin-treated cotton, wool, silk, regenerated cellulose, synthetic polyamide fibers, and paper, at all stages of manufactures it has been found that mixtures of two or more dyes of Formula I can be used with good success.

The new dyes are well suited for combination, so that dye salts of the same or different dye classes can be used for producing widely different shades.

The azo dyes obtained by the present process may belong, for example to the benzene-azo-benzene, benzene-azo-naphthalene, benzene-azo-pyrazolone, benzene-azo-acylacetic acid arylamide, benzene-azo-phenyl, benzene-azo-diphenyl, benzene-azo-benzene-azo-phenol, thiazoleazo-benzene, thia-diazol-azo-pyrazolone, pyridine-azo-indole, benzene-azo-tetrahydroquinoline, benzthiazol-azo-tetrahydroquinoline, thiazol-azo-tetrahydroquinoline, benzene-azo-indole, benzene-azo-quinoline, benzene-azo-pyrazolidinedione, benzene-azo-indanedione, benzene-azo-pyrrole, benzene-azo-benzo-tetrahydroquinoline, or quinoline-azo-benzene series etc. They can be produced by the known methods, either by coupling diazotized amines with azo components, or by oxidation coupling. The hydrazinium group can be linked to the diazo- and/or the azo component, in certain cases alongside other cationic groups, e.g. ammonium- or cycloammonium groups.

Diazo compounds of the benzene, naphthalene and heterocyclic series are suitable for the production of the azo dyes of the present process. The substituents in these compounds are preferably those which are employed in the known disperse (acetate) and polyester dyes. Particularly suitable are chlorine, bromine, fluorine, nitrile, nitro, alkyl, trihalogenalkyl, alkylsulfonyl, sulfonamide, monoalkyl and dialkyl-sulfonamide, carbalkoxy, carboxylic acid amide, hydroxyl, alkoxy and carbalkoxy groups.

Suitable coupling components are the derivatives of the benzene, naphthalene and heterocyclic series and components having an active methylene group. Particularly suitable are the substituted aminobenzene derivatives which may be further substituted by alkyl groups and the derivatives substituted in the aromatic nucleus by e.g. substituted or unsubstituted alkyl, alkoxy, halogen, cyan, trifluoromethyl, alkanoylamino, alkylsulfonylamino etc. The term "alkyl radical" refers not only to radicals, such as methyl, ethyl, propyl and butyl, but also to their substitution products (cf. E. de Barry, Anthracene and Anthraquinone, London 1921, p. 207). The substituents or substitution products which may be mentioned as examples are halogen, hydroxyl, as e.g. in the chloropropyl, hydroxyethyl and dihydroxypropyl radicals, ethers and esters, e.g. methoxyethyl and acetoxyalkyl radicals, the esters of carboxylic and sulfonic acids, e.g. in the carbalkoxyalkyl radical and the nitrile group, as e.g. in the cyanethyl radical.

In the following examples the parts and percentages are by weight and the temperatures in degrees centigrade.

EXAMPLE 1

A hydrochloric acid diazonium salt solution prepared in the usual way with 17.25 parts of 1-amino-2-chloro-4-nitrobenzene is adjusted at 0°, to a pH-value of 5–6 with sodium acetate. After filtering clear, a solution of 26 parts of the compound of the formula:

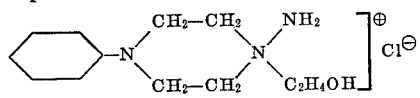

in 290 parts of water is added to it with stirring. The dye is precipitated immediately. It is filtered, washed with water and dried, and is obtained as a dark powder of melting point 182–187° and of the formula:

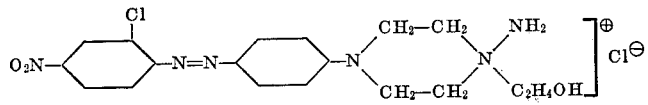

It dyes polyacrylonitrile fibers from neutral, acetic acid and sulfuric acid dyebath in orange shades of excellent fastness.

The azo compound used in the production of this dye is obtained by reacting N-phenyl-N'-hydroxyethyl piperazine with an ethereal chloramine solution. The melting point of the crude reaction product is 155–160°. On recrystallization from solution in alcohol-water the purified dye melts at 161–167°.

The anion may be exchanged by an anion exchanger and can be replaced by the ions of methyl sulfate, sulfate, disulfate, perchlorate, bromide, iodide, phosphorus molybdate, phosphorus tungsten molybdate, benzene-sulfonate, 4-chlorobenzene sulfonate, maleinate, oxalate, acetate, propionate, chloroacetate.

EXAMPLE 2

184 parts of N-ethyl-N-β-chloroethyl-amino-benzene are dissolved in 400 parts of ethanol and after adding 126 parts of 1,1-bishydroxyethyl-hydrazine the solution is heated at the boil with reflux for 24 hours. The solvent is then evaporated, the residue is extracted with benzene and then cristallized from a mixture of ethanol and acetone (1:2).

31 parts of the obtained product are dissolved in 400 parts of water and coupled with a hydrochloric acid diazonium solution produced in the normal way from 16 parts of 1-amino-2-chloro-4-nitrobenzene. The dye is precipitated with a little sodium chloride, filtered, washed with 1% sodium chloride solution and dried. A dark red-brown powder with a melting point of 211° is obtained.

EXAMPLE 3

4 parts of the dye 2-chloro-4-nitro-4'-[N-ethyl-N-(β-N'-hydroxyethyl-N'-methyl-aminoethyl)-amino]-1,1'-azobenzene are dissolved in 80 parts of dimethylformamide and 300 parts of chlorobenzene. Freshly prepared gaseous chloramine is added to this solution at 20° with thorough stirring in the course of 3 hours according to the apparatus described by Sisler et al. in J. Am. Chem. Soc. 76, 3906 [54]. The dye salt formed is precipitated and can be isolated by filtration from the chlorobenzene. On drying, a red powder is obtained which dyes "Orlon" (registered trademark) in level red shades of good light and wet fastness. In each case the production of chloramine is effected by the usual methods described in the literature (cf. e.g. G. H. Coleman, Inorganic Syntheses, vol. I, p. 59; Omietanski, Inorganic Syntheses, vol. V, p. 92; Gmelin, Handbook of Inorganic Chemistry, 8th Edition (1926), p. 418).

An ethereal chloramine solution, produced for example according to Inorganic Syntheses I, can be used for the process of the invention in place of gaseous chloramine.

EXAMPLE 4

17.25 parts of 1-amino-2-chloro-4-nitrobenzene in finely divided form are stirred into 100 parts of 15% hydrochloric acid at 0°. On the addition of 27 parts of a 4n-sodium nitrite solution the diazonium salt solution is formed in almost quantitative yield within 30 minutes at 0°. By adding 21 parts of a compound of the formula:

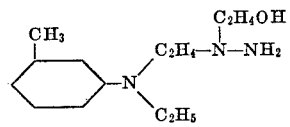

in solution in 100 parts of glacial acetic acid at 0°, the desired dye formation commences immediately. The coupling reaction is accelerated by rendering the solution weakly acid with sodium acetate. On completion of coupling the dye is filtered off, rinsed free of salt with water and dried.

The dye obtained is of low water solubility, and has the formula:

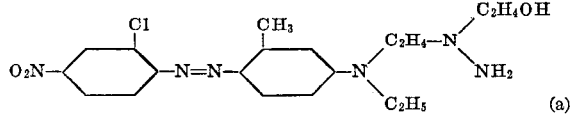
(a)

4.5 parts of the dye of Formula a are dissolved in 300 parts of chlorobenzene at 80°. 3 parts of dimethylsulfate are added and the resulting mixture is stirred over night at 80–90°. The dye salt is obtained as a dark red powder. The compound of the formula:

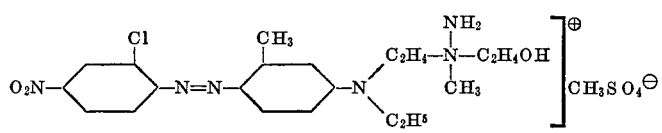

dyes polyacrylonitrile in dark red shades.

EXAMPLE 5

8 parts of finely pulverised, anhydrous sodium nitrite are added to 105 parts of sulfuric acid 96% at the temperature range of 60–70°. When this is completely dissolved, the nitrosylsulfuric acid formed is cooled to 15–20°. 100 parts of glacial acetic acid are run in at 20° and then 16.3 parts of 2-amino-5-nitrobenzonitrile are strewn in, followed by a further 100 parts of glacial acetic acid.

The solution is stirred for 2–3 hours at 15°. The excess nitrile is destroyed by the addition of 5 parts of urea and the solution then discharged into 350 parts of water. The diazonium salt solution at 0° is filtered and reacted with 29 parts of a compound of the formula

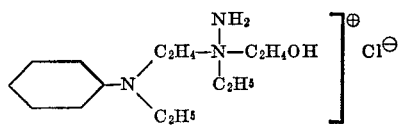

in solution in 200 parts of water.

The coupling reaction slowly commences: the pH value is brought to 5.5 by the addition of ammonia, upon which the coupling reaction takes place immediately so that the product can be filtered, rinsed and dried at once.

The resulting dye salt dyes polyacrylonitrile in ruby shades.

EXAMPLE 6

2.5 parts of the dye of the formula:

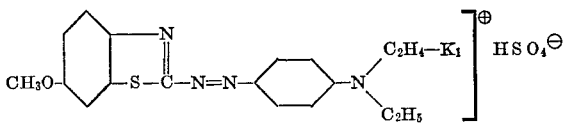

are dissolved in 50 parts of nitromethane and heated at 80°. At a temperature range of 80–90°, 0.8 parts of dimethyl sulfate are dropped in and the mixture stirred for 12 hours at 80°. The solvent is subsequently distilled off under reduced pressure. The dry distillation residue is then absorbed in the water/alcohol mixture, dissolved hot, and after filtering clear, let to cool.

The precipitated dye of the formula

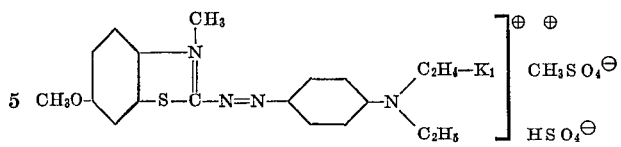

is obtained in an excellent yield. It dissolves in water with a blue coloration and dyes polyacrylonitrile fibers in brilliant blue shades from acetic acid, neutral or mineral acid baths, in which it is stable to prolonged boiling.

The dyeings on polyacrylonitrile fibers have excellent fastness to light, washing, perspiration, rubbing, wet and dry ironing, sea water, gas fumes, bleaching, cross dyeing and dry cleaning. The dye reserves wool and cellulosic fibers present in the same dyebath. The dyeings are level in shade.

EXAMPLE 7

25.6 parts of the monoazo dye 4'-nitro-4-amino-2-methylazobenzene produced by the known method are diazotized in finely dispersed form in aqueous hydrochloric acid with 20 parts of a 4 N aqueous sodium nitrite solution at 10–20°. The resulting diazonium salt is added to a soda-alkaline solution containing 24.9 parts of the coupling component of the formula:

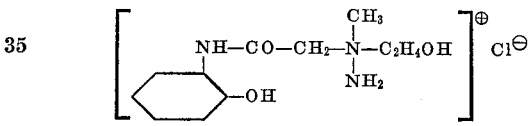

The coupling reaction takes place immediately. To isolate the dye, the mixture is rendered acid with aqueous hydrochloric acid, and the dye filtered off, rinsed and dried.

It has the formula:

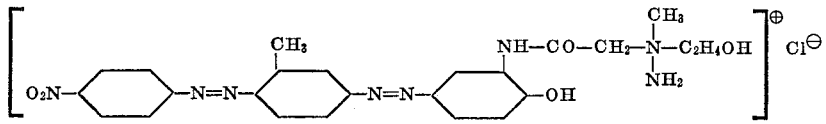

and dyes polyacrylonitrile fibers in orange shades.

DYEING EXAMPLE A 20 parts of the dye obtained according to Example 1 are intimately mixed with 80 parts of dextrin in a ball mill for 48 hours.

1 part of this preparation is pasted with 1 part of acetic acid 40%, 400 parts of distilled water at 60° are poured over the paste with constant agitation and the whole boiled for a short time. The solution is diluted with 7600 parts of distilled water, and 2 parts of glacial acetic acid are added. 100 parts of "Orlon" (registered trademark) are entered in this bath at 60°. The material was pretreated for 10–15 minutes at 60° in a bath of 8000 parts of water and 2 parts of glacial acetic acid. The dyebath is brought to 100° in 30 minutes, boiled for 1 hour and the material rinsed. A level red dyeing of excellent light fastness and very good wet fastness is obtained.

PAD DYEING EXAMPLE B

A padding liquor is prepared with:

50 grams per liter of dye (corresponding to the dyeing preparation produced in the previous dyeing example)
3 grams per liter of sodium alginate
5 grams per liter of acetic acid conc.
20 grams per liter of a cationic softener, e.g. a condensation product of 1 mol stearic acid and 1 mol triethanolamine
25 parts per liter of Glauber's salt.

Polyacrylonitrile fiber material is padded cold by the usual method on a 2 or 3 bowl pad. The pick-up is 80%. After intermediate drying for a short time at 90° on tenters, in a hot flue or by infrared radication, the material is fixed for 1-3 minutes with dry air at 170-190° on tenters, subsequently rinsed, soaped and rinsed again. A red dyeing with excellent light fastness is obtained.

TEXTILE PRINTING EXAMPLE

A printing paste is made up with:

| | Parts |
|---|---|
| Dye (corresponding to the dyeing preparation produced in the previous dyeing example) | 75 |
| Acetic acid conc. | 10 |
| Sodium alginate thickening | 450 |
| Cationic softener, e.g. a condensation product of 1 mol stearic acid and 1 mol triethanolamine | 25 |
| Glauber's salt | 25 |
| Water | 415 |
| | 1000 |

Polyacrylonitrile fiber material is printed according to the usual hand-block printing process and subsequently air-dried, steamed for 20-30 minutes in a star steamer with saturated steam, rinsed, soaped, rinsed again and dried. On polyacrylonitrile fabrics a red print with very good fastness properties is obtained.

In the following Tables 1 and 2 the symbols $K_1$, $K_2$ and $K_3$ represent the following groupings:

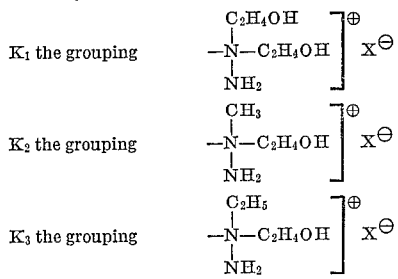

The symbols $K_1$, $K_2$ and $K_3$ and the amino $X^\ominus$ in the individually presented dyestuffs are chosen from the series displayed above or in the specification respectively. These groupings or these anions can be exchanged in any of the dyes for another grouping in the series or another anion. Thus, the symbols $K_2$ or $K_3$ may appear in place of $K_1$. It may therefore be noted as fundamental that in these dyes the symbol K with a given number may in each instance be exchanged for any other symbol K having a number different from it.

Further valuable basic dyestuffs which can be produced by the procedure given in the Examples 1 to 5 are described in the following Table 1:

They correspond to the formula:

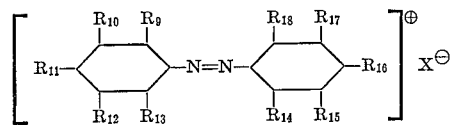

wherein the symbols $R_9$–$R_{18}$ have the meanings assigned them in the said table.

The anion $X^\ominus$ may be anyone of those named in the specification.

TABLE 1

| Example | $R_9$ | $R_{10}$ | $R_{11}$ | $R_{12}$ | $R_{13}$ | $R_{14}$ | $R_{15}$ | $R_{16}$ | $R_{17}$ | $R_{18}$ | Shade of the dyeing on polyacrylonitrile | Anion B $\ominus$ X |
|---|---|---|---|---|---|---|---|---|---|---|---|---|
| 8 | Br | H | $NO_2$ | H | H | H | H | $N(C_4H_9)(C_2H_4\text{-}K_2)$ | H | H | Red | Cl |
| 9 | CN | H | $NO_2$ | H | H | H | H | $N(C_2H_5)(C_2H_4\text{-}K_3)$ | H | $CH_3$ | Bordeaux | Cl |
| 10 | $NO_2$ | H | $NO_2$ | H | Cl | H | H | $N(C_2H_5)(C_2H_4\text{-}K_1)$ | H | $CH_3$ | Violet | Cl |
| 11 | $NO_2$ | H | $NO_2$ | H | Br | H | H | Same as above | H | $CH_3$ | ...do... | Cl |
| 12 | $SO_2\text{-}CH_3$ | H | $NO_2$ | H | H | H | H | $N(C_2H_5)(C_2H_4\text{-}K_2)$ | H | $CH_3$ | Bordeaux | $CH_3SO_4$ |

TABLE I—Continued

| Example | $R_9$ | $R_{10}$ | $R_{11}$ | $R_{12}$ | $R_{13}$ | $R_{14}$ | $R_{15}$ | $R_{16}$ | $R_{17}$ | $R_{18}$ | Shade of the dyeing on polyacrylonitrile | Anion $B^{\ominus}_X$ |
|---|---|---|---|---|---|---|---|---|---|---|---|---|
| 13 | Cl | H | $SO_2-NH_2$ | H | H | H | H | $N\begin{array}{c}C_2H_5\\C_2H_4-O-C_2H_4-K_1\end{array}$ | H | H | Orange | $CH_3SO_4$ |
| 14 | Cl | H | $CH_3-NH-SO_2$ | H | H | H | H | $N\begin{array}{c}C_2H_5\\CH_2-CHOH-CH_2-K_1\end{array}$ | H | H | Scarlet | $HSO_4$ |
| 15 | $(CH_3)N-SO_2$ | H | $NO_2$ | H | H | H | H | $N\begin{array}{c}C_2H_5\\C_2H_4-K_3\end{array}$ | H | Cl | Red | Cl |
| 16 | Br | H | $NO_2$ | H | H | H | H | $N\begin{array}{c}C_2H_5\\C_2H_4-K_1\end{array}$ | H | $CH_3$ | Red | Cl |
| 17 | Cl | H | $NO_2$ | H | Cl | H | H | Same as above | H | H | Yellow-brown | Cl |
| 18 | Cl | H | $NO_2$ | H | Cl | H | H | $N\begin{array}{c}C_2H_5\\C_2H_4NHCOCH_2-K_1\end{array}$ | H | H | ...do... | Cl |
| 19 | Cl | H | $NO_2$ | H | Cl | H | H | $N\begin{array}{c}C_2H_5\\C_2H_4CONHC_2H_4-K_1\end{array}$ | H | H | ...do... | $CH_3SO_4$ |
| 20 | Cl | H | $NO_2$ | H | H | H | H | $N\begin{array}{c}C_2H_3\\CH_2-C_2H_4-K_2\end{array}$ | H | H | Red | $HSO_4$ |
| 21 | CN | H | $NO_2$ | H | H | H | H | $N\begin{array}{c}C_2H_5\\CH_2CHOHCH_2-K_3\end{array}$ | H | H | Bordeaux | $CH_3SO_4$ |
| 22 | Cl | H | $NO_2$ | H | H | H | H | $N\begin{array}{c}C_2H_5\\CH_2C_3H_6-K_2\end{array}$ | H | H | Red | $CH_3SO_4$ |
| 23 | Cl | H | $NO_2$ | H | Cl | $CH_3$ | H | $N\begin{array}{c}C_2H_5\\C_2H_4-K_1\end{array}$ | H | H | Orange-brown | Cl |
| 24 | Br | H | $NO_2$ | H | Br | H | H | $N\begin{array}{c}CH_2CHOH-CH_2-K_1\\C_2H_5\end{array}$ | H | $CH_3$ | Brown | Cl |

TABLE 1—Continued

| Example | $R_9$ | $R_{10}$ | $R_{11}$ | $R_{12}$ | $R_{13}$ | $R_{14}$ | $R_{15}$ | $R_{16}$ | $R_{17}$ | $R_{18}$ | Shade of the dyeing on polyacrylonitrile | Anion B $^\ominus$X |
|---|---|---|---|---|---|---|---|---|---|---|---|---|
| 25 | OH | H | H | $CH_3$ | H | H | H | $-NH-CO-CH_2-K_2$ | H | H | Yellow | Cl |
| 26 | CN | H | H | Cl | H | $CH_3$ | H | $N \begin{smallmatrix}C_2H_5\\C_2H_4-K_1\\C_2H_5\end{smallmatrix}$ | H | H | Reddish-orange | Cl |
| 27 | Cl | H | $NO_2$ | H | $NO_2$ | H | H | $N \begin{smallmatrix}C_2H_5\\CH_2-CH \begin{smallmatrix}CH_3\\K_1\end{smallmatrix}\end{smallmatrix}$ | H | $CH_3$ | Violet | Cl |
| 28 | Cl | H | $NO_2$ | H | H | H | H | $N \begin{smallmatrix}C_2H_5\\C_2H_4-N-CO-CH_2-K_3\\\phantom{C_2H_4-}CH_3\end{smallmatrix}$ | H | H | Red | $CH_3SO_4$ |
| 29 | Cl | H | $NO_2$ | H | H | H | H | $N \begin{smallmatrix}C_2H_5\\C_2H_4-CO-N-C_2H_4-K_1\\\phantom{C_2H_4-CO-}CH_3\end{smallmatrix}$ | H | H | do | Cl |
| 30 | Br | H | $NO_2$ | H | $NO_2$ | H | H | $N \begin{smallmatrix}C_2H_5\\CH_2-CH \begin{smallmatrix}K_2\\CH_3\end{smallmatrix}\end{smallmatrix}$ | H | $CH_3$ | Violet | Cl |
| 31 | Cl | H | $NO_2$ | H | H | H | H | $N \begin{smallmatrix}K_1\\CH_2-CH-CH_3\\C_2H_5\end{smallmatrix}$ | H | H | Red | Cl |
| 32 | Cl | H | $NO_2$ | H | Cl | H | H | $N \begin{smallmatrix}CH_2-CH-CH_3\\\phantom{CH_2-CH-}K_2\\C_2H_5\end{smallmatrix}$ | H | $CH_3$ | Brown | Cl |
| 33 | Cl | H | $CH_3SO_2$ | H | H | H | H | $N \begin{smallmatrix}C_2H_4-K_1\\C_2H_5\end{smallmatrix}$ | H | $CH_3$ | Orange | Cl |
| 34 | Cl | H | $CH_3SO_2$ | H | Cl | H | H | Same as above | H | $CH_3$ | Orange-yellow | Cl |
| 35 | Cl | H | $CH_3SO_2$ | H | Cl | H | H | $N \begin{smallmatrix}CH_2-CH-K_2\\\phantom{CH_2-CH-}CH_3\\C_2H_5\end{smallmatrix}$ | H | H | Yellow | $CH_3SO_4$ |

TABLE I—Continued

| Example: | $R_9$ | $R_{10}$ | $R_{11}$ | $R_{12}$ | $R_{13}$ | $R_{14}$ | $R_{15}$ | $R_{16}$ | $R_{17}$ | $R_{18}$ | Shade of the dyeing on polyacrylonitrile | Anion $^{\ominus}X$ |
|---|---|---|---|---|---|---|---|---|---|---|---|---|
| 36 | CN | H | $NO_2$ | H | H | H | H | $N(C_2H_5)(CH_2-CH-CH_3\text{-}K_1)$ | H | $CH_3$ | Bordeaux | $HSO_4$ |
| 37 | Br | H | $(CH_3)_2N-SO_2$ | H | Br | H | H | $N(CH_3)(C_2H_4-K_1)$ | H | H | Yellow | $HSO_4$ |
| 38 | Cl | H | $(CH_3)_2N-SO_2$ | H | Cl | H | H | $N(C_2H_5)(C_2H_4-K_1)$ | H | H | ....do.... | Cl |
| 39 | Cl | H | $(CH_3)_2N-SO_2$ | H | Cl | H | H | $N(C_2H_5)(CH_2-CH-CH_3\text{-}K_2)$ | H | $CH_3$ | Orange | Cl |
| 40 | Cl | H | $CH_3-SO_2$ | H | Cl | H | H | $N(C_2H_5)(CH_2-CH_2-N(CH_2-CH_2-NH_2)(C_2H_4OH))$ | H | H | Yellow | Cl |
| 41 | Br | H | Br | H | H | H | H | Same as above | H | H | ....do.... | Cl |
| 42 | Cl | H | $(CH_3)_2N-SO_2$ | H | H | H | H | do | H | H | Orange-yellow | $CH_3SO_4$ |
| 43 | Br | H | $(CH_3)_2N-SO_2$ | H | Br | H | H | do | H | H | ....do.... | $CH_3SO_4$ |
| 44 | Cl | H | $(CH_3)_2N-SO_2$ | H | Cl | H | H | do | H | H | ....do.... | Cl |
| 45 | Cl | H | H | $(CH_3)_2N-SO_2$ | H | H | H | $N(C_2H_5)(C_2H_4-K_1)$ | H | H | Orange | Cl |
| 46 | CN | H | H | Cl | H | $CH_3$ | H | Same as above | H | H | ....do.... | Cl |
| 47 | $CH_3SO_2$ | H | Cl | H | Cl | H | H | $N(CH_3)(CH_2-CH-CH_3\text{-}K_1)$ | H | H | Yellow | Cl |
| 48 | Cl | H | $(CH_3)_2N-SO_2$ | Cl | H | H | H | $N(C_2H_5)(C_2H_4-K_1)$ | H | H | Orange | Cl |
| 49 | Cl | H | $NO_2$ | H | H | H | H | $N(CH_3)(C_2H_4-K_3)$ | H | H | Red | Cl |
| 50 | CN | H | H | CN | H | H | H | $N(C_2H_5)(C_2H_4-K_1)$ | H | H | Orange | Cl |

TABLE I—Continued

| Example: | $R_9$ | $R_{10}$ | $R_{11}$ | $R_{12}$ | $R_{13}$ | $R_{14}$ | $R_{15}$ | $R_{16}$ | $R_{17}$ | $R_{18}$ | Shade of the dyeing on polyacrylonitrile | Anion $B^{\ominus}X$ |
|---|---|---|---|---|---|---|---|---|---|---|---|---|
| 51 | Cl | H | $NO_2$ | H | Cl | H | H | $N\begin{smallmatrix}C_2H_5\\C_2H_4-K_1\end{smallmatrix}$ | H | H | Yellow-brown | $HSO_3$ |
| 52 | Cl | H | $NO_2$ | H | Cl | H | H | do | H | H | do | $C_2H_5SO_4$ |
| 53 | Cl | H | $NO_2$ | H | Cl | H | H | do | H | H | do | $ClO_4$ |
| 54 | Cl | H | $NO_2$ | H | Cl | H | H | do | H | H | do | $H-OOC-COO$ |
| 55 | Cl | H | $NO_2$ | H | Cl | H | H | do | H | H | do | $H-OOC-CH=CH-COO$ |
| 56 | Cl | H | $NO_2$ | H | Cl | H | H | do | H | H | do | $Br$ |
| 57 | Cl | H | $NO_2$ | H | Cl | H | H | do | H | H | do | $I$ |
| 58 | Cl | H | $NO_2$ | H | Cl | H | H | do | H | H | do | $CH_3COO$ |
| 59 | Cl | H | $NO_2$ | H | Cl | H | H | do | H | H | do | $C_2H_5-COO$ |
| 60 | Cl | H | $NO_2$ | H | Cl | H | H | do | H | H | do | $ClCH_2-COO$ |
| 61 | Cl | H | $NO_2$ | H | Cl | H | H | do | H | H | do | ⌬-$SO_3$ |
| 62 | Cl | H | $NO_2$ | H | Cl | H | H | do | H | H | Yellow-brown | Cl-⌬-$SO_3$ |
| 63 | Cl | H | $NO_2$ | H | H | H | H | $-N=N-$⌬(NH-CO-CH$_2$-K$_1$)(OH) | $OCH_3$ | H | Reddish-orange | |
| 64 | $CF_3$ | H | $NO_2$ | H | H | $CH_3$ | H | $-N=N-$⌬(NH-CO-CH$_2$-K$_3$)(OH) | $OCH_3$ | H | Scarlet | $CH_3SO_4$ |
| 65 | H | H | $K_1-C_2H_4-O$ | H | H | $O-C_2H_4OH$ | H | $-N=N-$⌬(OH) | H | H | Yellow | Cl |
| 66 | H | H | $SO_2N\begin{smallmatrix}CH_3\\C_2H_4-K_1\end{smallmatrix}$ | H | H | H | H | Same as above | H | H | Orange | Cl |
| 67 | H | H | $SO_2N\begin{smallmatrix}C_2H_5\\C_2H_4-K_1\end{smallmatrix}$ | H | H | $CH_3$ | H | do | $OCH_3$ | H | do | Cl |

Further valuable basic dyes which can be produced by the procedure given in the foegoing Examples 1 to 5 or in Example 6 are described in the following Table 2:

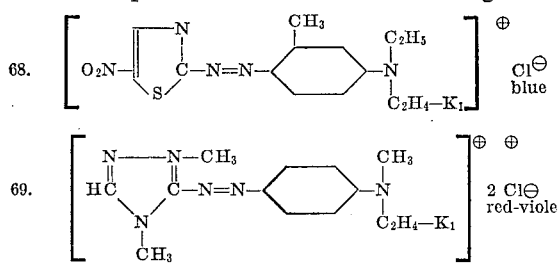

Formulae of representative dyes of the foregoing examples are as follows:

EXAMPLE 1

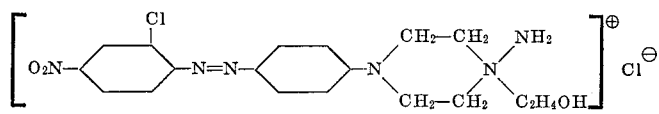

EXAMPLE 2

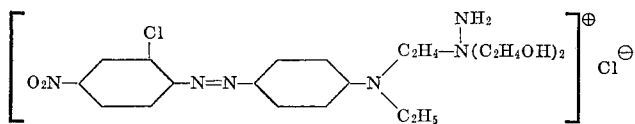

EXAMPLE 11

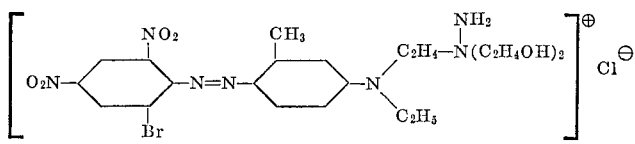

EXAMPLE 17

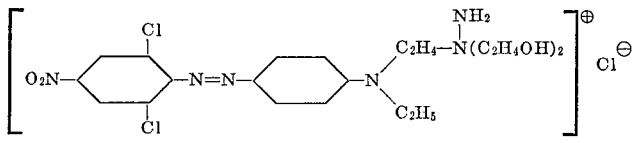

EXAMPLE 30

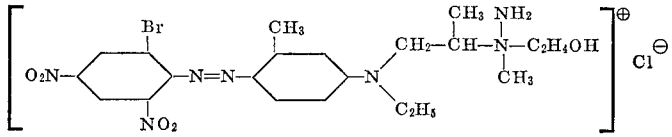

EXAMPLE 44

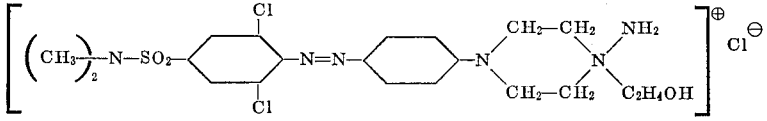

Having thus disclosed the invention what we claim is:
1. A basic dyestuff of the formula:

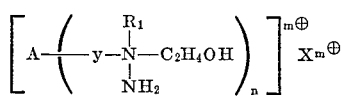

wherein:

A represents a member selected from the group consisting of a monoazo and a disazo dyestuff moiety, said moieties being free from carboxylic acid and sulfonic acid groups, y represents a bridge member directly affixed to a phenyl group which in turn is directly affixed to an azo group and is selected from the group consisting of

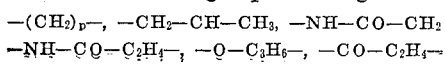

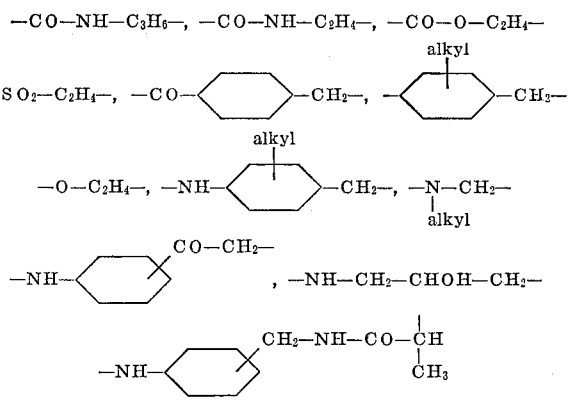

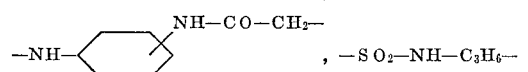

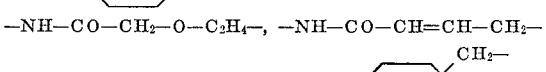

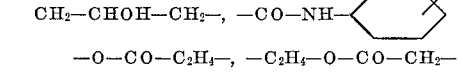

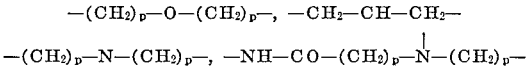

and

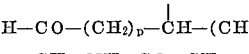

$p$ being an integer from 1 to 6 inclusive, and alkyl being lower alkyl throughout, $R_1$ represents a member selected from the group consisting of methyl, ethyl and hydroxyethyl, and together with the bridge member $y$ and the N-atom bound to $R_1$ the

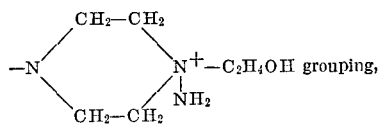 grouping, $n$ represents one of the integers 1 and 2,
$m$ represents one of the integers 1 and 2, when $n$ stands for the integer 1, and 2, when $n$ stands for the integer 2, and
X denotes an anion.

2. The basic dye according to claim 1, which corresponds to the formula:

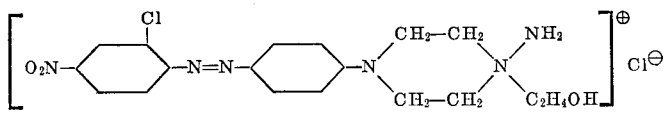

3. The basic dye according to claim 1, which corresponds to the formula:

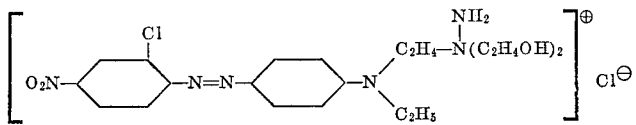

4. The basic dye according to claim 1, which corresponds to the formula:

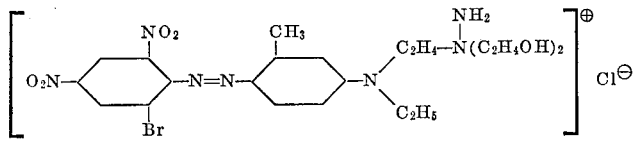

5. The basic dye according to claim 1, which corresponds to the formula:

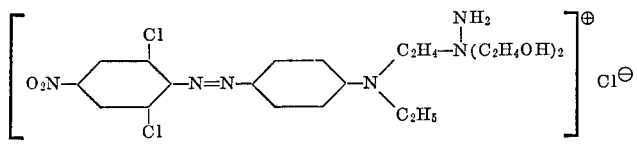

6. The basic dye according to claim 1, which corresponds to the formula:

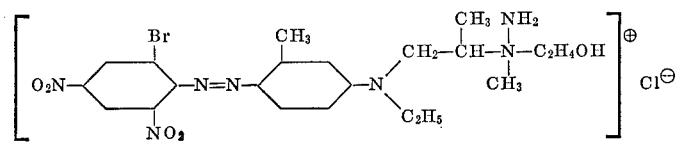

7. The basic dye according to claim 1, which corresponds to the formula:

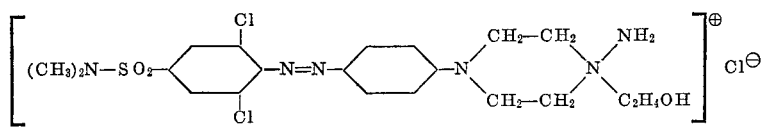

References Cited
UNITED STATES PATENTS

| | | | |
|---|---|---|---|
| 2,357,317 | 9/1944 | Dickey | 260—152 |
| 2,955,108 | 10/1960 | Omietansky | 260—205 |
| 3,190,871 | 6/1965 | Auerbach et al. | 260—146 |
| 3,206,451 | 9/1965 | Benz et al. | 260—146X |
| 3,280,100 | 10/1966 | Voltz | 260—146 |

FLOYD D. HIGEL, Primary Examiner

U.S. Cl. X.R.

8—41, 71; 260—146, 155, 157, 158, 162, 163, 165, 196, 207.5, 268